United States Patent [19]

Gunter et al.

[11] 4,390,214

[45] Jun. 28, 1983

[54] CRAWLER TRACK STRUCTURE HAVING WEAR SURFACE

[75] Inventors: Jonas L. Gunter, Canton; Doyle V. Haren, Clyde; Anatoli Hofle; Richard D. Medford, both of Waynesville, all of N.C.

[73] Assignee: Dayco Corporation, Dayton, Ohio

[21] Appl. No.: 340,556

[22] Filed: Jan. 18, 1982

Related U.S. Application Data

[63] Continuation of Ser. No. 128,338, Mar. 7, 1980, abandoned.

[51] Int. Cl.³ .............................................. B62D 55/26
[52] U.S. Cl. ..................................... 305/35 R; 305/53
[58] Field of Search ..................... 152/176, 185.1, 188, 152/210, 211; 305/35 R, 46, 51, 55, 35 EB, 54, 39, 53

[56] References Cited

U.S. PATENT DOCUMENTS

| | | | |
|---|---|---|---|
| 1,765,580 | 6/1930 | Haggart, Jr. | 305/46 |
| 1,915,561 | 6/1933 | Van Derveer | 305/55 UX |
| 2,672,910 | 3/1954 | Corson | 152/211 |
| 2,686,697 | 8/1954 | Baker | 305/51 X |
| 2,961,026 | 11/1960 | Stanton | 152/211 |
| 3,227,200 | 1/1966 | Andy | 152/211 |
| 3,261,646 | 7/1966 | Pax | 305/35 R |

FOREIGN PATENT DOCUMENTS

| | | | |
|---|---|---|---|
| 665092 | 9/1938 | Fed. Rep. of Germany | 305/35 R |
| 1650332 | 7/1971 | Fed. Rep. of Germany | 305/51 |

OTHER PUBLICATIONS

Brydson, J. A., *Plastics Materials*, Newnes-Butterworth, London, 1975, pp. 213, 214.

*Primary Examiner*—David A. Scherbel
*Attorney, Agent, or Firm*—Joseph V. Tassone

[57] ABSTRACT

A track structure for a crawler track of a crawler vehicle, a crawler track employing such a track structure, and method of making the track structure are provided wherein the track structure comprises an ultra high molecular weight polymeric material having a molecular weight of at least two million. The track structure may also be defined as a laminated construction having at least a portion thereof utilizing ultra high molecular weight polymeric material and the track structure may also have friction elements embedded in the polymeric material.

9 Claims, 13 Drawing Figures

CRAWLER TRACK STRUCTURE HAVING WEAR SURFACE

CROSS REFERENCE TO RELATED APPLICATION

This application is a continuation patent application of its copending parent patent application, Ser. No. 128,338 filed Mar. 7, 1980, and now abandoned in favor of this continuation application.

BACKGROUND OF THE INVENTION

1. Field of the Invention

This invention relates to crawler track structure for crawler vehicles.

2. Prior Art Statement

Crawler type vehicles are widely used for both military and civilian applications and a main characteristic of such crawler vehicles is that each of such vehicles utilizes so called crawler tracks as the means for moving same. The usual practice is to make each crawler track employing an endless chain mechanism, or the like, and provide cooperating track structures with such mechanism; and, each of these track structures is generally made of a metallic material, such as steel.

However, in many applications the crawler vehicle must operate on hard surfaces such as hard rock surfaces, concrete surfaces, metal surfaces, and the like where metal track structures tend to wear excessively and require frequent replacement. In other applications the high traction of a crawler vehicle may be required; however, it is undesirable to use metal track structures because it is necessary to provide a crawler vehicle of minimum weight and metal track structures are generally comparatively heavy. In still other applications it is necessary to provide crawler track structures which can operate on smooth hard surfaces, such as concrete or steel, with minimum slippage and the previous practice of attaching rubber pads, or the like, to the metal track structures, in an effort to improve traction, has not been entirely satisfactory due to excessive costs associated with attaching such rubber pads in position and the tendency of such rubber pads to be easily torn away.

SUMMARY

It is a feature of this invention to provide a track structure for a crawler vehicle wherein such track structure has great wear resistance, is of comparatively light weight, and is particularly adapted to have friction material attached thereto in a high-strength manner.

Another feature of this invention is to provide a track structure of the character mentioned comprised of an ultra high molecular weight polymeric material.

Another feature of this invention is to provide a track structure of the character mentioned comprised of such ultra high molecular weight material and which also comprises a plurality of friction elements embedded in the polymeric material which serves as a matrix therefor and wherein certain ones of the elements have an exposed surface comprising the wear surface of the track structure.

Another feature of this invention is to provide a track structure of the character mentioned wherein the friction elements are made of rubber.

Another feature of this invention is to provide a track structure of the character mentioned wherein the rubber defining the friction elements consists of a rubber compound having a natural affinity for the polymeric material thereby resulting in the provision of a tenacious bond therebetween.

Another feature of this invention is to provide a track structure of the character mentioned in the form of a laminated construction defined by a plurality of components comprising a base, a wear member, and means for attaching the wear member to the base and wherein the wear member is defined by ultra high molecular weight polymeric material.

Another feature of this invention is to provide a track structure defined as a laminated construction and having a plurality of friction elements embedded in the ultra high molecular weight polymeric material defining the wear member and with such polymeric material serving as a matrix for the friction elements.

Another feature of this invention is to provide an improved crawler track for a crawler vehicle wherein such track utilizes a track structure of the character mentioned.

Another feature of this invention is to provide an improved method of making a track structure for a crawler track of a crawler vehicle.

Therefore, it is an object of this invention to provide an improved track structure, crawler track utilizing such track structure, and method of making such track structure having one or more of the novel features set forth above or hereinafter shown or described.

Other details, features, uses, objects, and advantages of this invention will be come apparent from the embodiments thereof presented in the following specification, claims and drawings.

BRIEF DESCRIPTION OF THE DRAWINGS

Accompanying drawings show present preferred embodiments of this invention, in which.

DESCRIPTION OF ILLUSTRATED EMBODIMENTS

Figure 1:
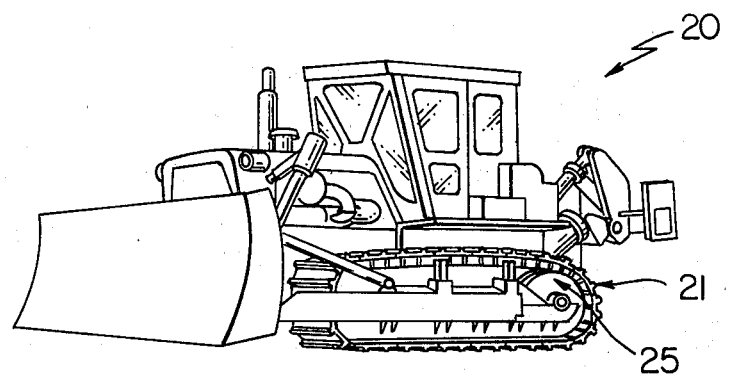
FIG. 1 is a perspective view illustrating one exemplary embodiment of a crawler vehicle which utilizes crawler tracks and crawler track structures in accordance with the teachings of this invention.
Figure 2:
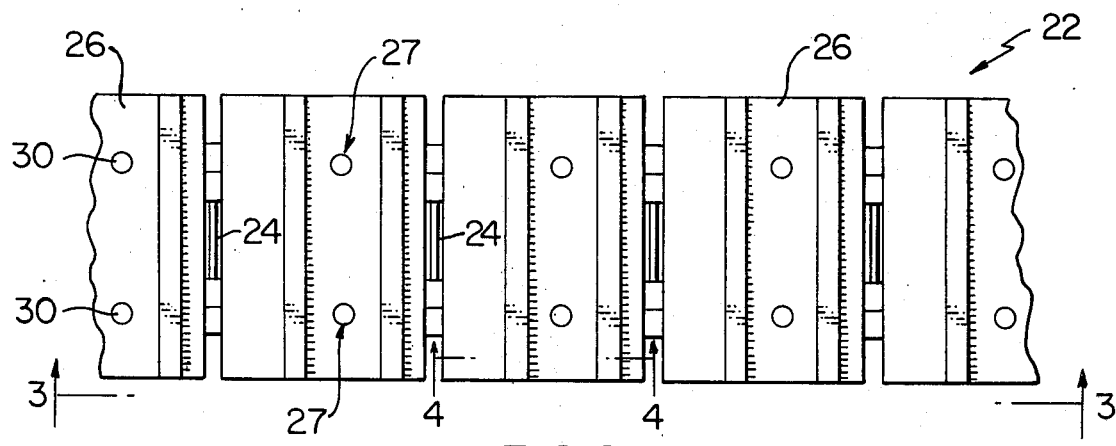
FIG. 2 is a fragmentary plan view looking perpendicularly toward the exposed surface of a straight section of one of the crawler tracks comprising the crawler vehicle of FIG. 1.

Reference is now made of FIG. 1 of the drawings which illustrates an exemplary crawler vehicle 20, shown in this example in the form of a bulldozer 20, which utilizes a pair of crawler tracks 21 made in accordance with the teachings of this invention and with only one of such tracks being visible in FIG. 1. Each crawler track 21 comprises an endless chain mechanism 22 (FIG. 3) comprised of a plurality of substantially indentical chain members 23 suitably fastened together by hinge pins 24 and as is known in the art; and, the chain mechanism 22 of each track 21 and hence the entire track is driven in an endless path by driving and support means of the crawler vehicle 20 indicated generally at 25 in FIG. 1 and as is known in the art and whereby further description of such driving and support means will not be presented herein. Each crawler track 21 also has a plurality of substantially identical cooperating track structures, each designated by the same reference numeral 26 with only a few of such track structures being thus designated in the drawings.

Figure 3:
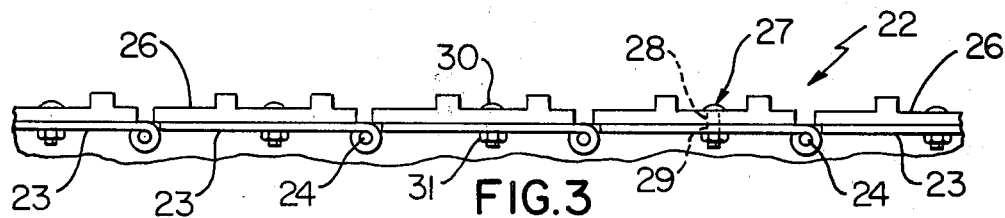
FIG. 3 is a fragmentary view, in elevation, taken essentially on the line 3—3 of FIG. 2.

Each crawler track 21 has means for fastening each track structure 26 to its chain mechanism 22, and in this example of the invention such fastening means is designated generally by the same reference numeral 27 in FIG. 3. The fastening means 27 for each track structure comprises opening means in each track structure 26 and chain member 23 and such opening means is shown as a pair of openings 28 in each track structure 26 which are adapted to be aligned with a cooperating pair of openings 29 in each associated chain member 23. The fastening means 27 for each track structure also comprises a pair of nut and bolt assemblies with each nut and bolt assembly consisting of a bolt 30 having an externally threaded portion and a cooperating nut 31 having an internally threaded portion.

In fastening each track structure 26 in position on its track 21 each bolt 30 has its threaded portion extended through an associated opening 28 in the track structure 26 and through an associated opening 29 in a chain member 23 whereupon a threaded nut 31 is threadedly fastened in position on the threaded portion of the bolt 30 sandwiching the associated track structure 26 and chain member 23 therebetween. In this example of the invention a pair of bolts 30 and cooperating nuts 31 are similarly fastened in position to fasten each track structure 26 to its chain mechanism 22.

Figure 4:
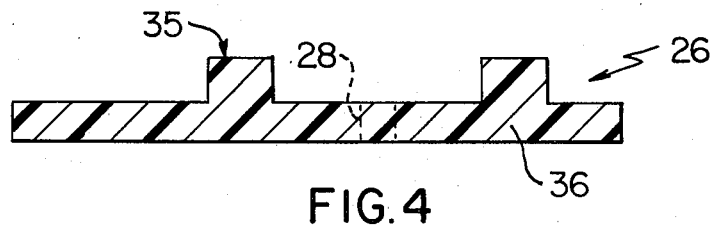
FIG. 4 is a cross-sectional view taken essentially on the line 4—4 of FIG. 2 and illustrating a typical track structure of the plurality of such structures used in crawler tracks of the vehicle of FIG. 1.

Reference is now made to FIG. 4 of the drawings which illustrates an enlarged cross-sectional view of an exemplary track structure 26 of this invention and it will be seen that such track structure has a wear surface which is designated generally by the reference numeral 35. In accordance with the teachings of this invention the track structure 26 is comprised of an ultra high molecular weight polymeric material which is designated generally by the reference numeral 36 and indicated by plastic cross-hatching in the drawing presentation of FIG. 4. The polymeric material 36 has a molecular weight of at least two million and preferably has a molecular weight ranging between 4 and 6 million and the exemplary track structure 26 is made entirely of ultra high molecular weight polymeric material 26.

The track structure 26 has opening means defined by the previously described pair of openings 28 each extending completely therethrough. In addition, by making each track structure 26 of ultra high molecular weight polymeric material each structure is of minimum weight yet has optimum abrasion resistance and durability. Further, each polymeric track structure 26 is essentially corrosion resistant, capable of withstanding high impact loads and useable with minimum of maintenance in practically all types of terrain and working environments.

Other exemplary embodiments of track structures of this invention are illustrated in FIGS. 5, 6-7, 8-9, 10-11, and 12-13 of the drawings. The track structures illustrated in FIGS. 5, 6-7, 8-9, 10-11, and 12-13 are very similar to the track structure 26; therefore, such track structures will be designated by the reference numerals 26A, 26B, 26C, 26D, and 26E respectively and representative parts of each track structure which are similar to corresponding parts of the track structure 26 will be designated in the drawings by the same reference numeral as in the track structure 26 whether or not such representative parts are mentioned in the specification, followed by the associated letter designation, either A, B, C, D, or E, and not described again in detail. Only those parts of each track structure which are substantially different from corresponding parts of the track structure 26 will be designated by a new reference numeral also followed by an associated letter designation and described in detail.

Figure 5:
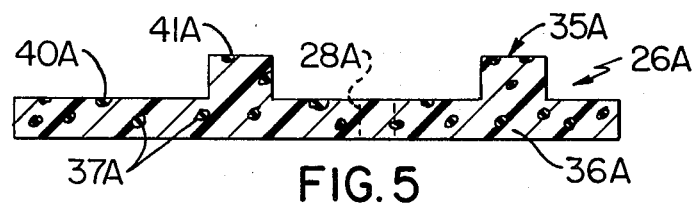
FIG. 5 is a view similar to FIG. 4 illustrating another exemplary embodiment of the track structure of this invention.

The track structure 26A of FIG. 5 is made primarily of ultra high molecular weight polymeric material 36A and has a wear surface 35A and opening means shown as a pair of openings each designated by the same reference numeral 28A and comprising the fastening means used in fastening the track structure 26A on the crawler track 21. The track structure 26A also comprises a plurality of friction elements which in this example are defined by irregular pieces of rubber of different sizes and with each friction element regardless of its shape or size being designated by the reference numeral 37A. The rubber friction elements 37A are embedded in the polymeric matrix material 36A which serves as a matrix therefor and it will be seen that the elements 37A are randomly disposed in the matrix 36A and certain ones of such elements, shown typically at 40A and 41A, have exposed surfaces or surface portions which comprise the wear surface 35A. The rubber elements 37A of each track structure 26A are particularly adapted to provide increased frictional engagement upon using the structures 26A on an associated crawler vehicle which is operated on a comparatively hard and smooth surface, such as concrete or steel.

Figure 6:
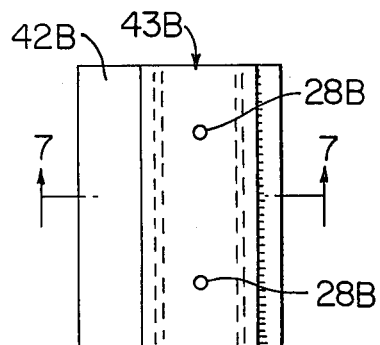
FIG. 6 is a plan view similar to a single track structure as shown in FIG. 2 and illustrating another exemplary embodiment of the track structure of this invention.
Figure 7:
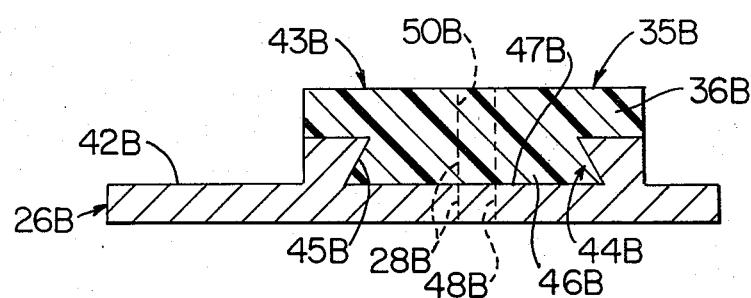
FIG. 7 is a cross-sectional view taken essentially on the line 7—7 of FIG. 6.

The track structure 26B shown in FIGS. 6 and 7 is a laminated structure yet has basic unique features which are similar to corresponding features of the structures 26 and 26A. The structure 26B comprises a base member or base 42B preferably made of a metallic material, a wear member 43B, and means for attaching the wear member 43B to the base 42B with such attaching means being designated generally by the reference numeral 44B in FIG. 7.

The wear member 43B is defined by ultra high molecular weight polymeric material 36B; and, the track structure 26B also has opening means, shown as a pair of openings 28B, and such openings comprise the fastening means for fastening the structure 26B on its associated crawler track.

As mentioned earlier the track structure 26B has means 44B for attaching the wear member 43B to the base 42B and in this example of the invention such attaching means 44B comprises a mortise 45B in the base 42B and a flaring tenon 46B in the wear member 43B. The mortise 45B and tenon 46B cooperate to define a dovetail joint, and in an ordinary dovetail joint of this type, it is not possible to have relative movement between the members 42B and 43B except in a direction perpendicular to the plane of the paper showing FIG. 7. However, in this particular dovetail joint relative movement between members 42B and 43B is prevented in all directions due to a tenacious adhesive bond 47B between adjoining surfaces of members 42B and 43B provided by molding these two members together, as will be described subsequently. Accordingly, the attaching means 44B comprises the cooperating mortise 45B, tenon 46B, and adhesive bond 47B.

As indicated earlier, the track structure 26B has opening means comprised of a pair of openings 28B which comprise associated fastening means for fastening the track structure 26B to an associated chain mechanism 22. Each opening 28B is defined by a pair of cooperating aligned openings 48B and 50B in the base 42B and wear member 43B respectively.

Figure 8:
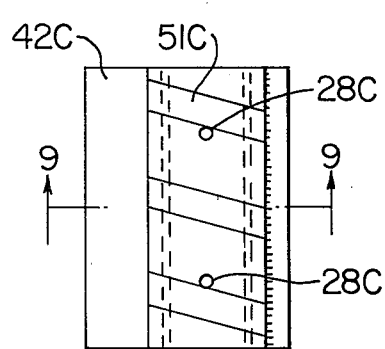
FIG. 8 is a view similar to FIG. 6 illustrating another exemplary embodiment of the track structure of this invention.
Figure 9:
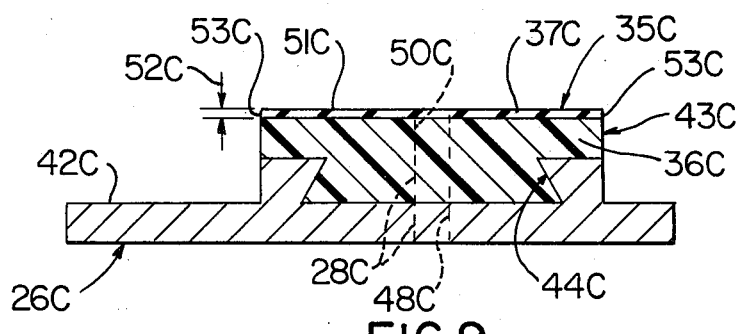
FIG. 9 is a cross-sectional view taken essentially on line 9—9 of FIG. 8.

The track structure 26C of FIGS. 8 and 9 comprises a base 42C, a wear member 43C, and attaching means 44C similar to the attaching means 44B of a track structure 26B, previously described. The wear member 43C is also made of an ultra high molecular weight polymeric material 36C; and, the track structure 26C also has opening means defined by a pair of openings 28C. As described for the track structure 26B each opening 28C is defined by a pair of aligned openings 48C and 50C in the base 42C and wear member 43C respectively.

The main difference between the track structures 26C and 26B is that the track structure 26C has a plurality of rubber friction elements 37C defining its wear surface 35C. Each of the rubber friction elements 37C of this example of the track structure 26C has a predetermined configuration and each has an exposed planar surface 51C which is disposed coplanar with a planar portion of the wear surface 35C.

Each rubber friction element 37C is a parallelepiped in configuration and has an entire thickness 52C thereof embedded in the polymeric matrix material 36C with a single opposed pair of its bases 53C exposed.

Figure 10:
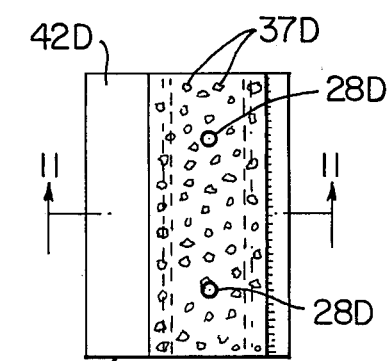
FIG. 10 is a view similar to FIG. 6 illustrating another exemplary embodiment of the track structure of this invention.
Figure 11:
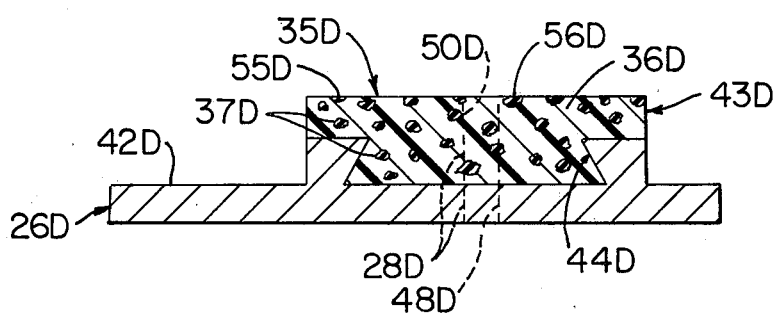
FIG. 11 is a cross-sectional view taken essentially on the line 11—11 of FIG. 10.

The track structure 26D of FIGS. 10 and 11 comprises a base 42D, a wear member 43D, and attaching means 44D similar to the attaching means 44B of track structure 26B, previously described. The wear member 43D is also made of an ultra high molecular weight polymeric material 36D; and, the track structure 26D also has opening means defined by a pair of openings 28D. As described in the track structure 26B, each opening 28D is defined by a pair of aligned openings 48D and 50D in the base 42D and wear member 43D respectively.

The main difference between the track structure 26B and the track structure 26D is in the wear members thereof. In the track structure 26D the wear member 43D has a plurality of rubber friction elements 37D embedded in a random manner throughout the polymeric material 36D with the material 36D serving as a matrix for the rubber elements 37D. In addition, certain ones of the rubber elements 37D have exposed surfaces comprising the wear surface 35D and as shown typically at 55D and 56D. In a similar manner as described in connection with the track structure 26A the rubber elements may be irregular in shape and of different sizes.

Figure 12:
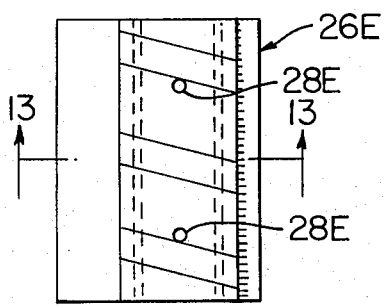
FIG. 12 is a view similar to FIG. 6 illustrating another exemplary embodiment of a track structure of this invention.
Figure 13:
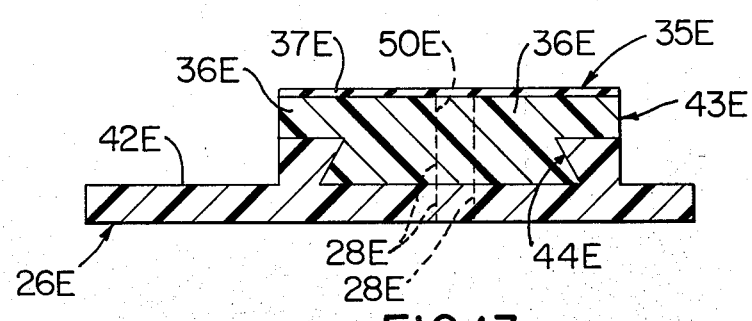
FIG. 13 is a cross-sectional view taken essentially on the line 13—13 of FIG. 12.

The track structure 26E of FIGS. 12 and 13 comprises a base 42E, a wear member 43E, and attaching means 44E similar to the attaching means 44B of track structure 26B, previously described. The wear member 43E is also made of an ultra high molecular weight polymeric material 36E; and, in a similar manner as described earlier the track structure 26E also has opening means defined by a pair of openings 28E; and, each opening 28E is defined by a pair of aligned openings 48E and 50E in the base 42E and wear member 43E respectively. The track structure 26E is similar to the track structure 26C in that it has a plurality of rubber friction elements 37E defining its wear surface 35E. Each rubber friction element 37E is a parallelepiped in configuration and is embedded in the polymeric matrix material 36E in a similar manner as the elements 37C of structure 26C.

The main difference between the track structure 26E and the track structure 26C is that the base 42E of structure 26E is made of a nonmetallic material which is shown in this example as synthetic plastic material instead of being made of metal.

In making the track structures 26 and 26A through 26E, each of such structures is preferably defined employing an associated mold apparatus or device. The mold device used to define the structures 26 and 26A defines the entire configurations of each of these structures. In the case of structures 26B through 26E the associated mold device for each is particularly adapted to receive the associated base member and during the molding action an associated wear member is simultaneously defined and attached in position to its base member. During the molding of each of the various track structures the molding may be achieved utilizing techniques which are known in the art and the molding is generally achieved at temperatures generally of the order of 250° F. to 450° F. and preferably at temperatures of 300° F. to 350° F. and at pressures ranging between 500 and 2000 pounds per square inch gage (psig). At these temperatures and pressures the molding action is usually achieved within time periods of three to thirty minutes. Following the molding action the associated track structure is cooled, removed from its associated mold structure or device, and trimmed of any flashing, or the like.

In the case of the track structures 26A and 26D, which employ friction elements consisting of irregular rubber elements 37A and 37D respectively, a substantial number of such elements are disposed in their mold device so as to define the initial wear surface of the associated track structure. Further, as a wear member tends to wear, other rubber elements embedded deeper within the ultra high molecular weight polymeric material are exposed.

In providing rubber friction elements 37A and 37D of irregular size in each of the track structures 26A and 26D the rubber friction elements and ultra high molecular weight polymeric material (such as polyethylene) have a weight ratio of 10-50 percent to 90-50 percent respectively. The irregular rubber elements 37A and 37D may be elements or particles of rubber scrap. These rubber particles may be of any suitable size; and, for one application of this invention particles ranging in size between 1/64 inch and ¼ inch across their largest dimension were considered satisfactory.

In the case of the embedment of rubber friction elements 37C and 37E having predetermined configurations of the type comprising track structures 26C and 26E respectively it will be appreciated that such friction elements are suitably disposed so as to comprise the wear surface of their associated track structures. Further, each of these elements need not necessarily have the shape of a parallelepiped but may have other predetermined configurations.

The bases 42B, 42C, and 42D of the track structures 26B, 26C, and 26D have been shown and described as being made of metallic material. Any suitable metallic material may be used for this purpose including any ferrous metal such as steel, aluminous metal, and the like. Similarly, it will be appreciated that the base member 42E of the track structure 26E be made of any suitable high strength polymeric material capable of having an ultra high molecular weight polymeric material 36E molded thereagainst.

As described earlier, each track structure 26 and 26A–26E is made of a ultra high molecular weight polymeric material having a molecular weight of at least two million and, preferably the molecular weight is in the range of four to six million. The preferred technique in determining this molecular weight is referred to as the intrinsic viscosity test and is widely used in the United States. Further, a preferred ultra high molecular weight polymeric material is polyethylene.

In addition to the configurations illustrated, the polymeric material may be formed in various configurations depending on the application of the associated track structure. In forming each track structure by molding action, ultra high molecular weight polymeric material may be provided in powder, flake, or pellet form and molded at the controlled temperatures, pressures, and time periods discussed previously.

The attaching means 44B, 44C, 44D, and 44E disclosed in each track structure 26B, 26C, 26D, and 26E respectively and extending between each associated wear member and base member may be comprised of a dovetail joint and adhesive bond provided by molding action. However, it may be desirable in many applications to mold each wear member independently of its base member and provide sufficient clearance between base member and wear member to enable periodic replacement of the wear member using the dovetail joint as attaching means, and also relying on frictional engagement between the dovetailed members to prevent sliding movement therebetween perpendicular to the plane of the paper. In any event, the fastening means comprised of the various openings 28 and 28A–28C together with associated bolts 30 and nuts 31 may also comprise the attaching means between components of each track structure.

As indicated previously, ultra high molecular weight polyethylene (UHMW) is the preferred material for use in making the track structure of this invention and this is due to its excellent abrasion resistance, impact resistance, low temperature properties, and chemical resistance. In applications where cost is a prime consideration and/or the need exists for friction elements in the track structure, rubber elements or pieces may be embedded in the UHMW polyethylene. The preferred rubbers are ethylene-propylene terpolymer type rubbers (EPDM) or saturated polyolefin type rubbers (EPT) because these two types tend to have a natural affinity for polyethylene. However, other rubbers may be used including neoprene, nitrile, natural, butyl, polyurethane, and the like.

While present exemplary embodiments of this invention, and methods of practicing the same, have been illustrated and described, it will be recognized that this invention may be otherwise variously embodied and practiced within the scope of the following claims.

What is claimed is:

1. In a track structure for a crawler track of a crawler vehicle wherein said structure has a substantially flat rectangular wear surface and means for fastening said structure on said crawler track, the improvement wherein said structure comprises an ultra high molecular weight polymeric material forming part of said wear surface and having a molecular weight of at least two million, and a plurality of rubber friction elements embedded in said polymeric material which serves as a matrix therefor, said elements each having an exposed surface comprising the remaining part of said wear surface, each of said rubber friction elements having a predetermined parallelepiped configuration, said exposed surface of each of said elements being a planar surface which is disposed coplanar with said first named part of said wear surface, said friction elements being disposed in spaced parallel relation to each other and each extending completely across said wear surface and crossing the longitudinal axis of said rectangular wear surface at angles other than right angles to said longitudinal axis of said rectangular wear surface.

2. A track structure as set forth in claim 1 in which said ultra high molecular weight polymeric material has a molecular weight ranging between four and six million.

3. A track structure as set forth in claim 1 wherein said polymeric material is polyethylene.

4. A track structure as set forth in claim 3 in which said rubber defining said friction elements is a rubber compound having a natural affinity for said polymeric material.

5. A track structure as set forth in claim 1 and comprising a base, a wear member, and means for attaching said wear member to said base, said ultra high molecular weight polymeric material and said rubber friction elements defining said wear member.

6. A track structure as set forth in claim 5 in which said base has a mortise therein and said wear member has a flaring tenon, said mortise and tenon cooperating to define a dovetail joint which comprises said attaching means, and said fastening means comprises at least one pair of aligned opened extending through said base and wear member, said aligned openings being particularly adapted to receive a fastener therethrough for fastening said track structure to said crawler track.

7. A track structure as set forth in claim 5 in which said fastening means comprises at least one pair of aligned openings extending through said base and wear member, said aligned openings being particularly adapted to receive a fastener therethrough for fastening said track structure to said crawler track.

8. A track structure as set forth in claim 5 in which said base is made of a material which is different from the polymeric material defining said wear member.

9. A track structure as set forth in claim 8 in which said base is made of metal.

* * * * *